United States Patent [19]

Wilfinger et al.

[11] 4,453,982
[45] Jun. 12, 1984

[54] STABILIZED METAL PIGMENTS AND METHOD OF PRODUCING SAME

[75] Inventors: Werner Wilfinger; Klaüs L. Behmel, both of Graz; Herbert Stania, Feldkirchen bei Graz, all of Austria

[73] Assignee: Vianova Kunstharz A.G., Werndorf, Austria

[21] Appl. No.: 447,098

[22] Filed: Dec. 6, 1982

[30] Foreign Application Priority Data

Dec. 18, 1981 [AT] Austria .................. 5436/81

[51] Int. Cl.³ .............................................. C09C 1/00
[52] U.S. Cl. ............................ 106/308 M; 106/290; 106/291
[58] Field of Search ................... 106/290, 291, 308 M; 523/205

[56] References Cited

U.S. PATENT DOCUMENTS

| | | | |
|---|---|---|---|
| 3,067,052 | 12/1962 | Frieser et al. | 106/290 |
| 4,115,338 | 9/1978 | Kobayashi et al. | 523/205 |
| 4,138,270 | 2/1979 | Ishijima et al. | 106/290 |
| 4,341,878 | 7/1982 | Marcantonio et al. | 106/80 |
| 4,350,535 | 9/1982 | Ishijima et al. | 106/290 |
| 4,395,485 | 7/1983 | Kashiwagi et al. | 106/308 M |

FOREIGN PATENT DOCUMENTS 356782 10/1979 Austria .
12205 6/1980 European Pat. Off. .

Primary Examiner—Helen M. McCarthy
Attorney, Agent, or Firm—A. W. Breiner

[57] ABSTRACT

Metal pigments stabilized against chemical influences particularly for use in aqueous paint systems by blending with the reaction product of an amine-aldehyde condensation product etherified with low molecular weight alcohols and an acidic phosphoric acid derivative of the general formula $$P(O) R_x (OH)_y$$

or a derivative of a polyphosphoric acid of the general formula $$[P(O) R_x (OH)_{y-z} O_{0.5 z}]_n,$$

wherein R is a radical linked to the phosphoric or polyphosphoric acid radical through a C—P— or C—O—P—linkage and which contains a group reactive with said amine-aldehyde condensation product; x being a number less than 3 and x+y equaling 3, z being the number of P—O—links stemming from a P-atom and being less than y, and n being the degree of polymerization.

22 Claims, No Drawings

STABILIZED METAL PIGMENTS AND METHOD OF PRODUCING SAME

The present invention relates to a process for stabilizing metal pigments against chemical influences exerted by corrosive media, and particularly to the stabilization of metal pigments against the impact of water or moisture to the stabilized metal pigments, and to paints containing the pigments. More particularly, the present invention is directed to a means for the processing of aqueous paints with pigments which are reactive with water.

Paints containing metal pigments are used for decoration and also for protection against corrosion. The so-called "metallic paints" have gained popularity during recent years, particularly for line coating, mainly in the automobile industry. Further, the corrosion protection provided by certain metal pigments has been utilized in paints on a technical scale. Normally the latter paints will have a higher level of metal than the "metallic paints." These paints contain metal pigment powders based on aluminum, magnesium, copper, iron (steel), and also alloys such as bronzes. In most cases the metallic paints utilize aluminum powder with a varying degree of fineness and surface treatment, the structure of the metal particles being flat, in order to achieve the desired effects. The anti-corrosive paints can utilize less anisotropic metal particles such as bead-shaped particles.

All paints containing metal pigments have the following problems:

(1) The fine particle metals normally used as pigments react with water, with hydrogen being formed. This reaction with water, on the one hand, can reduce or destroy the desired optical effect and, on the other hand, the hydrogen gas formed may lead to explosion of paint tanks containing the paints.

(2) In the event the metallic paints are applied as a single coat, the embedded metal particles may be corroded by the atmospheric-chemical influences, for example as a result of the acidic soot settling in towns and industrial areas.

Many attempts have been made to overcome the aforesaid problems connected with the use of metal pigments. For example, in order to prevent atmospheric corrosion, pigment grades of very pure aluminum which have an enhanced resistance to acids are recommended. These pigment grades, however, are substantially more expensive than standard pigment pastes and, therefore, cannot be widely used. Additionally, pigment manufacturers offer special metal pigment pastes for aqueous paints. The publication *Alcoa Pigments Technical Data*, Report No. 100, July 1975, entitled "Aluminium Hydro-Pastes Promise Industry-Wide Impact" describes a new technology whereby the aluminum pigment contains a wetting agent and a volatile corrosion inhibitor. Treatment with water-repellent agents are recommended by other authors. According to U.S. Pat. No. 3,926,874, polyamides, fatty acid amides, or fluorine or silicone containing wetting agents with specific surface tensions are used in the paints. U.S. Pat. No. 3,839,254 discloses the use of perfluorine wetting agents, and U.S. Pat. No. 4,138,270 describes fatty acids or fatty acid alkanolamides in combination with non-ionic wetting agents for the same purpose. All of these methods fail to provide sufficiently durable protection for the metal pigment in the paint. It is assumed that the additives which, owing to a danger of reducing film performance of compatibility can be used at only a restricted level, will be detached or removed from the metal surface by the organic solvents contained in aqueous paints and also by the binders.

Another method of protecting metal pigments from the influence of water includes the coating of the pigment particles with crosslinked polymers. German Offenlegungsschrift No. 30 20 073 describes a method for obtaining metal powder pigment pastes dispersible in water which uses organic phosphoric acid esters of long-chain alcohols as the coating material. These coatings give a stable linkage to the metal, thus preventing detachment or removal by the paint binder. However, the described phosphoric acid and derivatives of technical quality always contain small quantities of free phosphoric acid which exerts a negative effect on the film properties, if used in relatively high amounts; and, accordingly, German Offenlegungsschrift cautions that large amounts of these phosphoric acid esters should not be used. German Auslegeschrift No. 24 32 796 discloses metal pigments which offer protection against atmospheric corrosion which are coated by a method whereby vinyl monomers are polymerized on the metal pigment. The coemployment of phosphoric acid containing monomers improves the adhesion of the protective layer to the pre-activated surface of the pigment particles.

A disadvantage of the known coating methods, including the above, is the fact that several expensive production steps are necessary to produce the special pigments. Furthermore, the very thin protective layer on the pigments may be damaged during manufacture or transport of the paint, for example with the normal geared pumps, thereby reducing the anti-corrosive effect.

Accordingly, it is a primary object of the present invention to provide an improved process for stabilizing metal pigments particularly useful in aqueous paints and where the stabilizing agent may be used at a sufficiently high level so as to provide a reserve in the paint in the event the original protective coating on the pigment particles is damaged. It has been found that metal pigments can be stabilized against chemical influences by chemically linking the stabilizer to the metal pigment and, on film formation, linking chemically the stabilized pigment particle to the paint binder. This chemical linking is accomplished by coating the metal pigment with an amine-aldehyde resin which is modified with a phosphoric acid derivative. This stabilization is particularly suited for aqueous systems.

More specifically, the presently disclosed process for stabilizing metal pigments against chemical influences, particularly for use in aqueous paint systems, is characterized in that a metal pigment prior to the addition to the paint system, or in situ in the paint system, is blended with a reaction product of an amine-aldehyde condensation product etherified with low molecular weight alcohols and an acidic phosphoric acid derivative of the general formula $$P(O)R_x(OH)_y$$

and/or a derivative of a polyphosphoric acid of the general formula $$[P(O)R_x(OH)_{y-z}O_{0.5\,z}]_n,$$

at 10 to 80° C., preferably 15 to 40° C., until hydrogen formation caused by the reaction ceases. In the above general formulas, R designates a radical linked to the phosphoric or polyphosphoric acid radical via C—P— or C—O—P—links and which contains groups functional towards the amine-aldehyde condensation product, formed from alkyl, cycloalkyl or aryl radicals and may contain

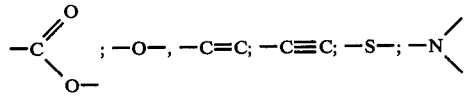

or heterocyclic radicals; x is a number less than 3 and x+y equaling 3, z (the number of P—O-links stemming from a P—atom) being less than y, and n being the degree of polymerization.

In accordance with the present invention it is possible, without sophisticated or special equipment, optionally during paint production, to stabilize metal pigments for use in aqueous paint systems. The metal pigments treated according to the invention may also be used to advantage in non-aqueous systems since the coating also protects the metal pigment from corroding influence in the cured paint film. As a result of the process of the invention, the expensive pigments consisting of high purity aluminum which, according to the information of the manufacturers, have a higher resistance to acids need not be used.

The metal pigments treated according to the process of the invention have excellent dispersing characteristics and can be adjusted exactly to the paint binder system, including through selection of the coating medium. Because of the compatibility between the paint system and coating, an excess of the coating medium is in no way detrimental; rather, in most cases, essential advantages are achieved since the coating medium at the same time serves as crosslinking component, the phosphoric acid component, in addition, acting as catalyst for the crosslinking reaction. In the crosslinked film there is a chemical bond between the surface of the metal pigment and the binder and, optionally, with the surface of the substrate. A further benefit of the process of the invention resides in the fact that the obtained pigment preparations give particularly pale and brilliant metal effects. It is assumed that this is attributable to the dissolution of the greying fine particles and abrasions in the metal pigment. In single coat applications of the paints containing the pigments, an improvement in the corrosion protection is observed as a result of the effect of the phosphoric acid ester on the painted substrate.

The preparation of the phosphoric acid modified amine-aldehyde products useful according to this invention are described in Austrian patent specification No. 356,782 (European patent application No. 00 12 205). The products produced according to this patent specification are particularly advantageous in that they contain practically no free phosphoric acid and, accordingly, detriment to the paint film is avoided. The preferred reaction products for use according to the present invention have an acid value of 10 to 80 mg KOH/g.

The quantity by weight of the phosphoric acid modified amine-aldehyde stabilizer (calculated as resin solids) can be roughly calculated according to the guide equation $$K = \frac{\text{weight of stabilizer}}{\text{weight of metal}} \times \text{acid value of the stablilzer,}$$

whereby the resulting value K should be at least 1 and preferably over 50. With insufficient quantities of stabilizing agent, the protective effect is not complete or the reaction speed with the metal surface is too low. The upper limit is set by the paint properties of the paint system for which the stabilized metal pigment is to be used. In the preferred range, an excess of the stabilizer is used so that the full advantages of the invention may be realized. The maximum amount of the stabilized metal pigment which can be employed in a stoving paint system is when up to 80 to 100% of the total resin used in the paint formulation is derived from the modified amine-aldehyde condensation product of the stabilizer, with supplementing with normal amine resins.

When the paint systems are not heat-hardenable, the stabilizer is normally added in somewhat lower amounts.

The preparation of the stabilized metal pigments is carried out through intimate mixing of the metal pigment with the stabilizer, at 10 to 80° C., preferably at 15 to 40° C. The blending is continued until the formation of hydrogen gas has ceased. Initially, the reaction may be effected through mere storage of the blend. The total time, depending on the materials employed and on the reaction conditions, normally requires from 30 minutes to 48 hours. In a preferred embodiment, the blend of metal pigment, stabilizer and, optionally, a water-miscible solvent, for example a glycol ether such as butyldiglycol, is thoroughly blended for 30 minutes to 1 hour with effective stirring, and then allowed to stand for 12 to 16 hours at room temperature, the end of the reaction being determined by the cessation of gas formation.

Aluminum pigments available as pastes are preferably used, and particularly those which are pastes in aliphatic or aromatic hydrocarbons. Other reactive metal pigments such as those based on zinc, magnesium, copper, steel (iron), bronzes, brass, and the like can be utilized. Metal powders, not in the form of pastes, can also be used. In this case suspension of the metal powders in a solvent suitable for subsequent paint formulation is advantageous. The metal pigments stabilized according to the invention, due to the bonding of the phosphoric acid groups to the metal, are stable in aqueous paints over a wide range of the pH-values, normally between 4 to 10; the protective effect being further enhanced through the more or less hydrophobic amine resin portion of the stabilizer.

Further processing of the stabilized pigment paste is carried out in the conventional manner by stirring it into the other paint components, including with other colored pigments and dyestuffs for obtaining special effects. The pigment pastes of the invention can be used in all water-soluble or water-dilutable paint systems. When using them in a solvent soluble paint system, minimum quantities of water will bring out enhanced radiance and brightness. The compatibility of the pigment paste with the paint system should be checked individually, the stabilizer offering immense possibilities for adjustment. The preferred binders for use with the stabilizer metal pigments are preferably those which can be thermally crosslinked with amine resins. The corresponding types of the basis of hydroxy and/or carboxy and/or acid amide group containing polyesters, alkyd resins, or acrylic resins are known in the art.

For binder systems which are not heat-hardenable, the stabilizer is added in smaller quantities than in the case of stoving systems. However, the value K should be at least 1.

The following examples illustrate the invention without limiting its scope. Parts or percentages given refer to weight unless otherwise stated. All examples marked (+) are comparison examples.

Preparation of the Stabilizer (A) 275 parts of a reaction product of 204 parts hydroxypivalic acid neopentylglycolester and 71 parts phosphoric acid ($P_4O_{10}$-content 84%) are reacted under vacuum at 100° C. in the presence of 490 parts diethyleneglycolmonobutylether (BDG) with 1200 parts hexamethoxy methylmelamine, until an acid value of 60 mg KOH/g is attained. The product is diluted with ethyleneglycol monoethyl ether (EGL) to a solids content of 80% and has an intrinsic viscosity of 4.6 ml/g (measured in dimethylformamide (DMF) at 20° C.).

(B) As in (A) above, 115 parts of a reaction product of 1045 parts of a neopentylglycolisononanoic acid polyester are reacted at 80° C. under vacuum in the presence of 490 parts BDG with 70 parts of polyphosphoric acid ($P_4O_{10}$-content 84%) until an acid value of 65 mg KOH/g is attained. The product is diluted with EGL to a solids content of 70% and has an intrinsic viscosity of 4.2 ml/g (measured in DMF at 20° C.). The polyester, acid value 18 mg KOH/g, was prepared from 270 parts neopentylglycol, 25 parts isononanoic acid and 260 parts phthalic anhydride. Examples 1-7

According to Table 1, dispersions of metal pigments were prepared using the following metal pigments:

MP I: Commercially available aluminum paste having a fineness of between 30 μm and 10 μm; non-leafing type; metal content 65%, solvent content (including fats and additives) 35%; solvents: white spirit/benzene; average particle size (DIN 4190) = 22 μm.

MP II: Commercially available special aluminum paste for aqueous paints; metal content 65%. According to the manufacturer, the pigment paste contains a corrosion inhibitor and otherwise has specifications corresponding to that of MP I.

MP III: Commercially available gold bronze powder, rich lead gold; 100% metal content.

TABLE 1

| Example | pts | MP | pts | SOL | pts N | pts ST | K-value |
|---|---|---|---|---|---|---|---|
| 1(+) | 61.5 | I | 38.5 | BDG | — | — | — |
| 2 | 22.0 | I | 14.6 | BDG | — | 63.4 A | 213 |
| 3 | 96.0 | I | 1.0 | EDG | — | 3.0 B | 2 |
| 4(+) | 61.5 | II | 38.5 | BDG | — | — | — |
| 5(+) | 65 | III | 35 | BDG | — | — | — |
| 6 | 14.3 | III | 22.3 | BDG | — | 63.4 A | 213 |
| 7(+) | 61.5 | I | 29 | BDG | 9.5 | — | — |

SOL solvent
EDG = diethyleneglycolmonoethylether
BDG = diethyleneglycolmonobutylether
N anionic wetting agent based on high molecular weight polycarboxylic acids
ST stabilizer of invention Comparison of the Metal Pigment Pastes Prepared According To EXAMPLES 1-7

Test paints were formulated according to Table 2 employing the metal pigments of Examples 1-7 (Examples 1, 4, 5, and 7 are comparison examples).

AC: Commercially available water-soluble arcrylic copolymer with 50% solids content; solvent BDG; recommended by the manufacturer as pigment medium in conjunction with acrylic copolymer dispersion AD.

AD: Aqueous acrylic copolymer dispersion, recommended by the manufacturer for combination with the aqueous acrylic copolymer AC; solids content 50%.

AH: Commercially available anionic water-soluble paint binder based on oil-free alkyd resins.

HMMM: Hexamethoxymethylmelamine.

p-TSS: p-toluolsulfonic acid, 33%, neutralized with dimethylethanolamine.

The paints are prepared by dispersing the pigment pastes (according to Examples 1-7) in AC or AH. Prior to dilution with water, amine resin HMMM, when used, is admixed. When copolymer AC is used, the paint is finished with copolymer AD. Then, when used, the crosslinking catalyst p-TSS is added. Paint 5 is stabilized in situ upon paint preparation.

TABLE 2

| | PAINT FORMULATIONS | | | | | | | | | |
|---|---|---|---|---|---|---|---|---|---|---|
| | P-1 | P-2 | P-3 | P-4 | P-5 | P-6 | P-7 | P-8 | P-9 | P-10 |
| AC | 20 | 16 | 20 | 20 | 16 | 20 | 16 | — | — | 20 |
| AH | — | — | — | — | — | — | — | 80 | 72.7 | — |
| AD | 40 | 40 | 40 | 40 | 40 | 40 | 40 | — | — | 40 |
| metal pigment according to Example | | | | | | | | | | |
| 1(+) | 8.8 | — | — | — | — | — | — | 8.8 | — | — |
| 2 | — | 23.6 | — | — | — | — | — | — | 21.5 | — |
| 3 | — | — | 5.5 | — | — | — | — | — | — | — |
| 4(+) | — | — | — | 8.8 | — | — | — | — | — | — |
| 5(+) | — | — | — | — | 5.2 | — | — | — | — | — |
| 6 | — | — | — | — | — | 23.6 | — | — | — | — |
| 7(+) | — | — | — | — | — | — | — | — | — | 8.8 |
| ST A | — | — | — | — | 15 | — | — | — | — | — |
| MP I | — | — | — | — | 5.2 | — | — | — | — | — |
| HMMM | 10 | — | 10 | 10 | — | 10 | — | 8 | — | 10 |
| BDG | — | — | 4.2 | — | 3.4 | 3.2 | — | — | — | — |
| H2O | 20 | 20.4 | 20.3 | 20 | 20.4 | 20.4 | 20.4 | 3.2 | 5.8 | 20 |
| p-TSS | 1.2 | — | — | 1.2 | — | 1.2 | — | — | — | 1.2 |

The paints P-1-P-10 prepared according to Table 2 are diluted with deionized water to a viscosity of 20 s/DIN 53 211/20° C. and sprayed by pressurized air onto cleaned steel panels. After 10 minutes of flash-off, the paints are stoved for 30 minutes at 150° C. Dry film thickness = 30-35 μm. Pendulum hardness according to DIN 53 157 was measured. The effect of the stabilizer of the invention was evaluated after various periods of storage of the paints.
A: application=2 hours after preparation
B: application=24 hours after preparation
C: application=21 days after preparation
D: application=21 days after preparation
A-C: =storage at room temperature
D: =storage at 40° C.
Evaluation was governed by the following criteria:
SH: very bright
H: light
LV: slightly greyed
SV: strongly greyed
LG: slightly yellowed
SG: strongly yellowed
Z: metal pigment destroyed
SSV: very strongly greyed.

TABLE 3

| Pendulum | Paints* | | | | | | | | | |
|---|---|---|---|---|---|---|---|---|---|---|
| | P-1 | P-2 | P-3 | P-4 | P-5 | P-6 | P-7 | P-8 | P-9 | P-10 |
| Hardness ± 5 s | 140 | 140 | 140 | 140 | 140 | 140 | 140 | 140 | 140 | 140 |
| A | H | SH | H | H | H | H | SH | H | SH | H |
| B | LV | SH | H | H | H | LG | SH | LV | SH | H |
| C | SSV | SH | LV | LV | H | SG | SH | SSV | SH | SSV |
| D | Z | SH | LV | SV | LV | Z | SH | Z | SH | SSV |

*Paints P-1, P-4, P-6, P-8, and P-10 are comparison paints; and P-2, P-3, P-5, P-7, and P-9 are made using the metal pigment dispersions of this invention.

Paints P-1 A and P-2 A were tested for salt spray resistance according to DIN 50 021 on zinc-phosphated steel. Rust creepage at the cross incision is listed in Table 4 (mm).

TABLE 4

| Test Duration | Paint P-1 A | Paint P-2 A |
|---|---|---|
| 120 hours | 15 mm | 3 mm |
| 168 hours | 60% detachment | 3 mm |
| 240 hours | 100% detachment | 10 mm |

In order to determine the regeneration of the protective effect of the stabilizers of the invention, paints 1, 2, and 4 were stirred for one hour in a paint conditioner and were applied as above after having been allowed to stand for one hour. Paints 1 and 4 gave strongly greyed films; paint 2 showed no difference.

USE OF THE PROCESS OF THE INVENTION IN SOLVENT DISSOLVED BINDERS; TEST FOR ACID RESISTANCE

According to Table 5 paints were prepared, using various metal pigment pastes, containing 100 parts of binder (resin solids) and 6 parts aluminum. The binder was a 78:22 blend of a commercially available crosslinking acrylic resin, 50% solids in xylol/butanol (defined by the manufacturer as a carboxy and hydroxy group containing copolymer; viscosity (DIN 53 211/20° C.), 120–210 s; acid value (DIN 53 402/14–22 mg/KOH/g), and a commercially available non-plasticized highly reactive melamine resin, 60% solids in butanol; viscosity (DIN 53 211/20° C.) 180–220 s. The paints were diluted to spray application with xylol and applied to glass plates. After stoving for 30 minutes at 135° C., a film with about 35 μm thickness resulted.

The test was made by allowing a 30% sulphuric acid solution to act for 8 hours at 25° C.

TABLE 5

| | Paint | | |
|---|---|---|---|
| | P-11 | P-12 | P-13 |
| MP according to Example 1(+) | 15.0 | — | — |
| MP according to Example 1(1)(+) | — | 15.0 | — |
| MP according to Example 3 | — | — | 9.6 |
| acrylic resin | 156.0 | 156.0 | 156.0 |
| melamine resin | 36.7 | 36.7 | 36.3 |
| solvent(2) | 25.0 | 25.0 | 32.0 |
| modified polysiloxane | 0.1 | 0.1 | 0.1 |
| acid resistance(3) | XX | i.o. | i.o. |

(1)MP used in Example 1 was replaced by an analogous paste of aluminum of high purity.
(2)hydrocarbon solvent rich in aromatic fractions
(3)i.o. in order (no change)
XX light patches where acid was applied through dissolution of the metal pigment Example 8:

Preparation And Use Of A Stabilized Zinc Paste

A zinc pigment paste was prepared in the manner stated above, with K=3, from 5.37 parts of stabilizer (A)/80% solids, 3.20 parts BDG, and 91.43 parts zinc dust (fine, paint quality). The paste, used in an aqueous paint, was stored for 4 days at 40° C. without the pigment being destroyed, not the binder precipitating. The paint had the following composition: 77.80 parts of a non-drying alkyd resin, water-soluble upon neutralization with amines, based on vegetable fatty acids, 70% solids (acid value 55–65 mg KOH/g), 680.90 parts of the above pigment paste, 77.80 parts of talcum (extender), 7.80 parts dimethylethanolamine, and 155.70 parts water.

As will be apparent to one skilled in the art, various modifications can be made within the scope of the aforesaid description. Such modifications being within the ability of one skilled in the art form a part of the present invention and are embraced by the appended claims.

It is claimed:
1. Process for stabilizing metal pigments against chemical influences for use in paint systems comprising blending a metal pigment with the reaction product of an amine-aldehyde condensation product etherified with low molecular weight alcohols and an acidic phosphoric acid derivative which has the formula

P (O) R$_x$ (OH)$_y$ or a polyphosphoric acid derivative of the general formula

[P (O) R$_x$ (OH)$_{y-z}$ O$_{0.5\ z}$] n, wherein R is a radical linked to the phosphoric or polyphosphoric acid radical through a C—P- or C—O—P-linkage and which contains a group reactive with said amine-aldehyde condensation product; x being a number less than 3 and x+y equaling 3, z being the number of P—O-links stemming from a P-atom and being less than y, and n being the degree of polymerization, at from about 10 to 80° C. until hydrogen formation caused by the reaction ceases; the weight ratio between said reaction product and metal pigment expressed by the value $$K = \frac{\text{weight of reaction product}}{\text{weight of metal}} \times \text{acid number of said reaction product,}$$

being at least 1.

2. The process of claim 1 wherein said blending of metal pigment and said reaction product is carried out prior to addition of the metal pigment to a paint system.

3. The process of claim 1 wherein said blending of said metal pigment to said reaction product is carried out in situ in paint system.

4. The process of claim 1 wherein said blending occurs at a temperature at from about 15 to 40° C.

5. The process of claim 1 wherein said group reactive with said amine-aldehyde condensation product is formed from alkyl, cycloalkyl, or aryl radicals.

6. The process of claim 5 wherein said reactive group includes.

or a heterocyclic radical.

7. The process of claim 1 wherein K has a value of above 50.

8. The process of claim 1 wherein the reaction between said reaction product and the metal pigment is carried out in the presence of a water-miscible solvent.

9. The process of claim 8 wherein said water-miscible solvent is a glycol ether.

10. The process of claim 1 wherein the metal pigment and said reaction product are blended for 30 minutes to 1 hour with high stirring and then subsequently stored at room temperature until gas formation ceases.

11. The process of claim 1 wherein said metal pigment is in the form of a metal powder based on aluminum, zinc, magnesium, copper, steel, bronze, brass, and mixtures thereof.

12. The process of claim 11 wherein said metal powders are pretreated with a solvent or a wetting agent.

13. The process of claim 11 wherein said metal powder is in the form of a paste.

14. Metal pigments reacted with the reaction product of an amine-aldehyde condensation product etherified with low molecular weight alcohols and an acidic phosphoric acid derivative of the general formula $$P(O) R_x (OH)_y$$

or a polyphosphoric acid derivative of the general formula $$[P(O) R_x (OH)_{y-z} O_{0.5\ z}]\ n,$$

wherein R is a radical linked to the phosphoric or polyphosphoric acid radical through a C—P- or C—O—P-linkage and which contains a group reactive with said amine-aldehyde condensation product; x being a number less than 3 and x+y equaling 3, z being the number of P—O-links stemming from a P-atom and being less than y, and n being the degree of polymerization; the weight ratio between said reaction product and metal pigment expressed by the value $$K = \frac{\text{weight of reaction product}}{\text{weight of metal}} \times \text{acid number of said reaction product,}$$

being at least 1.

15. The metal pigments of claim 14 wherein said group reactive with said amine-aldehyde condensation product is formed from alkyl, cycloalkyl, or aryl radicals.

16. The metal pigments of claim 15 wherein said reactive group includes.

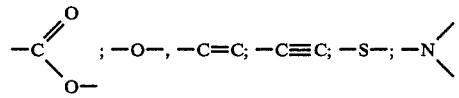

or heterocyclic radicals.

17. A paint formulation containing the metal pigments of claim 14.

18. The paint of claim 17 wherein the vehicle includes water.

19. The paint of claim 17 wherein the vehicle includes an organic solvent.

20. The paint of claim 17 wherein said reaction of metal pigment and said reaction product is carried out prior to its addition to a paint system.

21. The paint of claim 17 wherein said reaction of metal pigment and said reaction product is carried out in situ during the formation of the paint system.

22. The paint of claim 17 wherein the quantity of resin in said paint system is present at a level of from 80 to 100% as a result of the amine-aldehyde condensation product of said reaction product.

* * * * *